United States Patent
Kunert

[11] Patent Number: 5,398,446
[45] Date of Patent: Mar. 21, 1995

[54] WINDOW WITH OPENABLE CASEMENT

[76] Inventor: Heinz Kunert, Am Krieler Dom 23, 5000 Köln 41, Germany

[21] Appl. No.: 924,102

[22] Filed: Aug. 3, 1992

[30] Foreign Application Priority Data

Aug. 3, 1991 [DE] Germany .................. 41 25 834.7

[51] Int. Cl.⁶ ............................................. E05D 15/48
[52] U.S. Cl. ........................................ 49/169; 49/390; 49/192; 49/153
[58] Field of Search .............. 49/192, 388, 390, 402, 49/163, 168, 169, 62, 67, 170, 171, 153, 154, 155, 156, 157, 158, 161, 253

[56] References Cited

U.S. PATENT DOCUMENTS

| | | | |
|---|---|---|---|
| 1,760,994 | 6/1930 | Piotti | 49/161 X |
| 2,493,501 | 1/1950 | Reinmuller . | |
| 2,739,355 | 3/1956 | Poggi | 49/192 X |
| 2,888,721 | 6/1959 | Hagerty | 49/390 |
| 2,977,646 | 4/1961 | Flaherty | 49/390 X |
| 3,122,799 | 3/1964 | Lunde | 49/153 |
| 3,507,073 | 4/1970 | Wegefelt | 49/192 |
| 3,676,955 | 7/1972 | Schacht . | |
| 3,878,644 | 4/1975 | Brown et al. | 49/390 X |
| 3,911,623 | 10/1975 | Walter | 49/390 |
| 4,081,934 | 4/1978 | Franz | 49/390 X |
| 4,235,048 | 11/1980 | Gillery | 49/390 |
| 4,875,312 | 10/1989 | Schwartz | 49/388 X |

FOREIGN PATENT DOCUMENTS

| | | | |
|---|---|---|---|
| 1083198 | 1/1955 | France | 49/192 |
| 1908370 | 6/1964 | Germany . | |
| 2754955 | 6/1978 | Germany . | |
| 2907626 | 6/1979 | Germany . | |
| 226684 | 6/1969 | Sweden | 49/402 |
| 23723 | of 1894 | United Kingdom | 49/390 |
| 705864 | 3/1954 | United Kingdom | 49/192 |

*Primary Examiner*—Jerry Redman
*Attorney, Agent, or Firm*—Ostrolenk, Faber, Gerb & Soffen

[57] ABSTRACT

A window, arranged in a frame, rotatable by 180° around a central axis, having at least one casement which can be opened in a conventional manner. The window includes an insulating glass pane made of a colorless glass pane and a selective absorption pane, a frame enclosing the insulating glass pane on all sides, a hinge arranged in the area of one lateral edge for the opening of the casement, a reversing hinge arranged in a vertical or horizontal central axis on the frame for the 180° rotation of the insulating glass pane, a structurally fixed blind frame and an encircling gasket between the structurally fixed blind frame and the frame for the insulating glass pane.

18 Claims, 4 Drawing Sheets

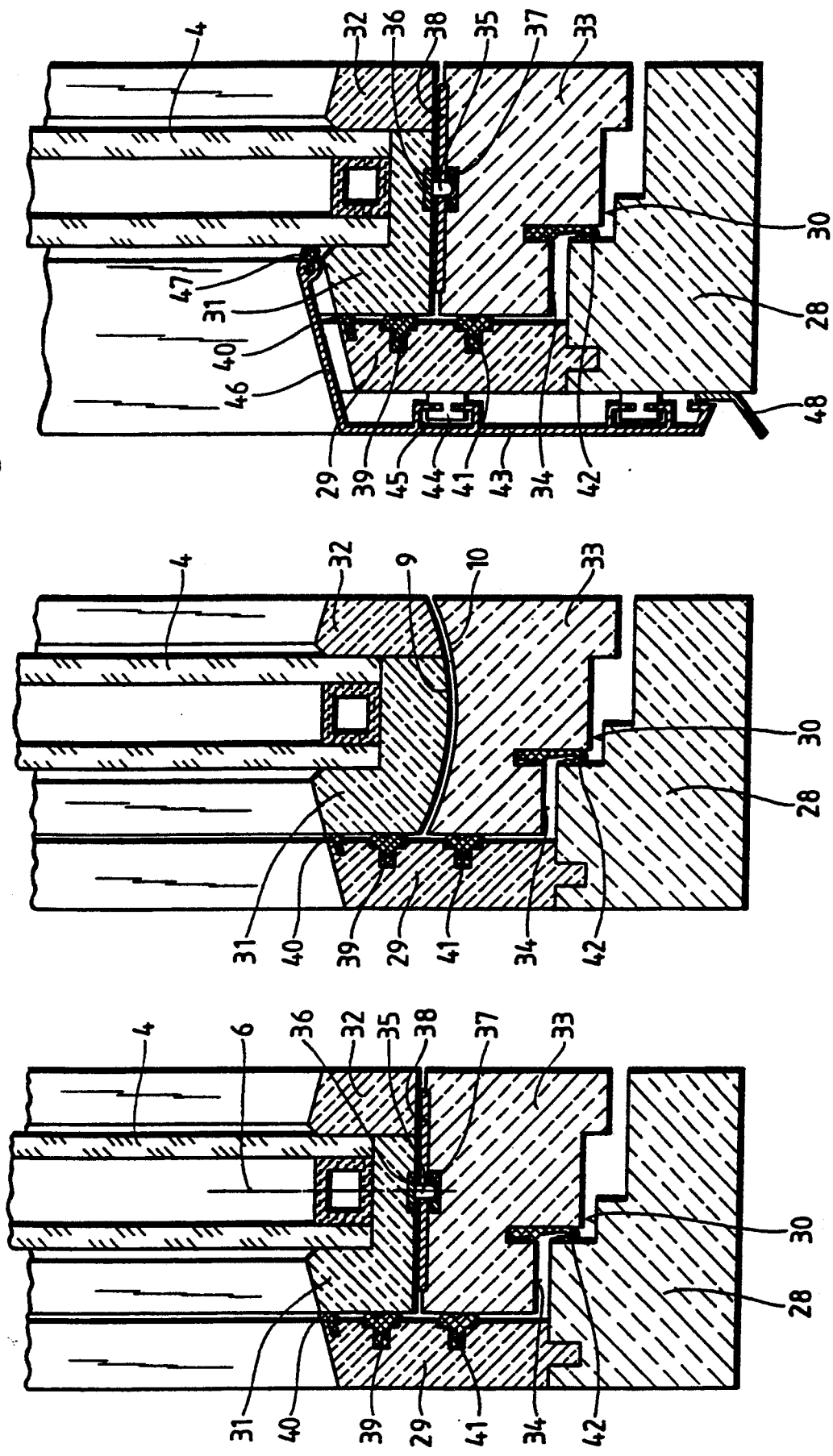

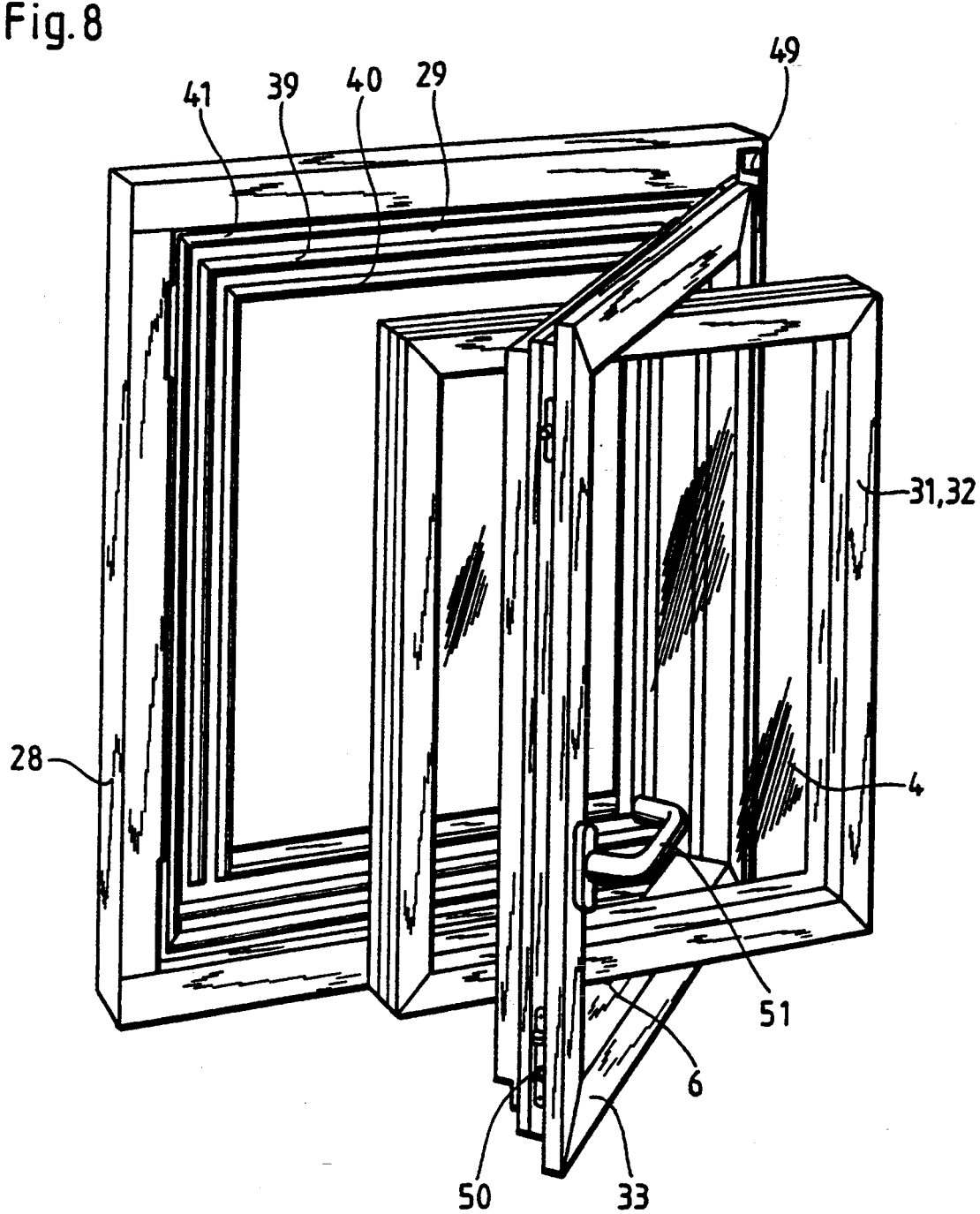

WINDOW WITH OPENABLE CASEMENT

BACKGROUND OF THE INVENTION

1 FIELD OF THE INVENTION

The invention concerns a window with openable casement and an insulating glass pane made out of a colorless glass pane and an absorption pane, selective for solar radiation.

Due to the above-mentioned glass pane combination, insulating glass elements of this type have, depending on their positioning relative to the radiation source, different transmission characteristics for the transmission of solar radiant energy. Depending on the position of the absorption pane with respect to the radiation source, such an insulating glass element can therefore be utilized in the summer as a sunshade element having a low radiant energy transmission and in the winter as solar collector element having a high solar radiant energy transmission. By designing such insulating glass panes so that they are reversible, i.e. so that the insulating glass pane can be directed, as desired, with one or its other face towards the outside of a room, the costs for air conditioning of rooms equipped with such insulating glass panes can be reduced both in winter and in summer.

The absorption pane of the insulating glass element, which is designed to be selective with regard to the invisible range of the solar radiation and which points outwards in the summer position, absorbs the invisible parts of the solar energy spectrum and converts them to thermal energy which is dissipated to the external atmosphere by convection and radiation. This effect is aided by the application of a coating, reducing the emission of thermal radiation of long wavelength, on the inner surface of the absorption pane. The visible solar radiation portion penetrates both the absorption pane and colorless glass pane of the insulating glass element which is arranged behind the former and is transparent to the complete radiation spectrum.

By a 180° rotation of the insulating glass element, the colorless glass pane points, in the winter position, in the direction of the radiation source. The incident solar radiation penetrates this pane almost without any loss and strikes the absorption pane which is now turned towards the room. Both the penetrating visible portions as well as the portions of the solar radiation spectrum absorbed and converted to thermal energy by this pane benefit the room since the emission reducing coating of the absorption pane, now turned to the outside, prevents the dissipation of heat to the outside.

An additional effect heightens the energy gain on the side of the room. Already at low solar radiation intensity, the absorption pane turned towards the room is heated to room temperature. During this temperature alignment, the pane takes on a thermal resistance value which is quasi infinite with respect to the air of the room. The effective k value of the insulating glass element is then k=0.

2. Description of the Related Prior Art

In particular two versions of rotating windows are known from construction engineering which mainly serve the purpose of making it possible to carry out a cleaning of the external pane from inside the room when the window is closed.

In one of the versions, the casement frame which carries the insulating pane is centrally positioned inside the blind frame. The sealing and the mechanical locking of the casement takes place by means of profiled strips, laterally inserted all around in the blind frame, which, on closing, engage in corresponding slots of the casement frame.

This concept proves to have as a disadvantage the high production cost of the locking mechanism, which at the same time has to provide the sealing function as well as the strength against lateral thrusts due to wind.

Another concept in the design of a rotating window lies in the rotation by displacement of a lateral axis of the casement frame from one blind frame side to the opposite in leading the pivot pin into the blind frame. The parallel guidance of the pivot pin into a corresponding slot of the blind frame has here proven to be technically complicated and expensive since the pivot pin always has to be fixed on both sides and displaced steadily in vertical position.

In both versions, the rotation of the casement is carried out within the plane of the blind frame. This results in general in a significant disadvantage for both concepts if thermally asymmetric insulating glazings are utilized for the purpose described hereinbefore.

During the summer and winter periods, the casement frame is in each case exposed to different climatic conditions. Due to the alternating climatic influences, a varying expansion behaviour of the window sides and thus warping of the casement frame can be expected, in particular in the case of wooden windows, but also in the case of plastic and aluminum windows.

In the German Unexamined Patent Application 27 54 955, a window is described with a thermmaly asymmetric insulating glass pane which can be rotated 180°. Therefore, another rotating window concept comes to fruition. The turning of the insulating glass pane is accomplished in a conventional turning sash, in fact after opening this turning sash by 90°, thus outside the plane of the blind frame. The known window has an insulating glass pane over the central section of which, in the vertical axis of symmetry, U-shaped housings engage, which work together with pivots, located in a rigid frame which can correspond to the frame of a casement. On both sides of the insulating glass pane, sealing and positioning frames are arranged which are used to ensure the sealing of the glazing at its points of contact. The sealing and positioning frames which are carried by the rigid casement frame are hinged to the frame by means of hinges in which case the external sealing and positioning frame has to be equipped with a return device in order to pull it again close to the casement frame after opening. Each sealing and positioning frame has two encircling gaskets, of which one is positioned against the casement frame and the other against the insulating glass pane when the two sealing and positioning frames are locked with the casement frame. By opening the sealing and positioning frame, the insulating glass pane is released and can be turned 180° around the axis of rotation. Afterwards, the sealing and positioning frames are again closed and this unit can be opened in the usual way as a casement. It is obvious that such a casement is expensive since it consists in total of three movable frames for each of which swivel hinges in the form of hinges have to be provided. Furthermore, all three frames must have locking devices in order to be able to lock them one with the other and with regard to the stationary blind frame. Finally, a total of four encircling gaskets are required in order to position and seal the insulating glass pane. Another encircling gasket is required in order to seal the casement with respect to the blind frame.

SUMMARY OF THE INVENTION

It is therefore an object of the present invention to provide a window of the type mentioned hereinabove which has the thermal properties of known windows, but is simpler and less expensive to manufacture.

Starting with this statement of the problem, it is suggested in the case of a window of the aforementioned type that the insulating glass pane inside a frame forming a casement is arranged according to the present invention in such a way that it can be rotated 180° around a vertical or horizontal central axis and is sealed with respect to the structurally fixed blind frame by an encircling gasket. The result is thus that the window according to the present invention, just as a conventional window, has only one encircling gasket between the casement and the structurally fixed blind frame, whereby the manufacturing is simplified quite significantly. Furthermore, a frame which encloses the insulating glass pane on all sides can be provided to only serve for holding the insulating glass pane and to accommodate the reversing hinge, with this frame being undetachably connected to the insulating glass pane. The sealing between the structurally fixed blind frame and the insulating glass pane is direct or via the insulating glass pane frame which rests via the encircling gasket directly against the structurally fixed blind frame so that an additional gasket for the casement frame is not required although the arrangement of an encircling gasket between the casement frame and the insulating glass pane frame is in addition possible.

Due to the fact that the sealing occurs directly between the structurally fixed blind frame and the insulating glass pane, or the frame enclosing the latter, it is possible to dispense completely, if required, with a casement frame. In order to ensure the 180° reversibility, it is in this case possible to hinge the insulating glass pane or the insulating glass pane frame to the structurally fixed blind frame by means of parallel guides which, as desired, can be locked with or released from the insulating glass pane frame so that the insulating glass pane for the opening of the casement is connected with the guides so it cannot rotate or, after releasing the lock, so it is possible to rotate the insulating glass pane 180°.

If the insulating glass pane is arranged in a rotary way in a frame, which forms a casement and is hinged to the blind frame, so that the insulating glass pane or the insulating glass pane frame in the closed position of the casement frame rests with one side against the blind frame and encloses the gasket between itself and the structurally fixed blind frame, the outsides of the frame for the insulating glass pane, parallel to the axis of rotation, and the corresponding insides of the frame, forming the casement, can be designed with a radius corresponding to the distance to the swivel hinge for the 180° rotation of the insulating glass pane so that the insulating glass pane frame can be fitted with little clearance in the casement frame. The sides of the insulating glass pane frame and the casement frame, facing the structurally fixed blind frame, can then preferably be in one plane and fit against a projection of the structurally fixed blind frame. A locking mechanism can be arranged in the usual way between the structurally fixed blind frame and the casement frame. Another locking mechanism can be arranged between the casement frame and the insulating glass pane frame.

The locking can take place utilizing the locking fixtures used for conventional windows. While for the locking between the blind frame and the casement frame a locking band encircling three sides is preferably used, a simple pin-type locking system which enters laterally from the casement frame into the pane frame and which can be manufactured fitted with lock and key, is sufficient to ensure the locking between the casement frame and the glass frame. In, for example, office buildings or hotels, the rotation of the glass frame outside of the appropriate climatic seasons by unauthorized persons can in this way be prevented.

Furthermore, for the locking between the casement frame and the blind frame, a two-step locking fixture can be used in an advantageous way which, in a first step, releases the lock between the casement frame and the blind frame and after unlocking the casement frame by further actuation, in a second step, then unlocks in like manner the connection between the window frame and the glass frame.

Another embodiment is based on fitting the casement frame from the inside against the blind frame and dimensioning the circumferential width of the casement frame or the frame holding the glass in such a way that its edge turned towards the insulating glass does not extend beyond the corresponding frame edge of the blind frame. In this way the framing of the turning sash, after the window is closed, is covered by the blind leaf, in fact in both turning positions so that the frame material is not exposed to the wear and tear of the weather.

The material of the casement frame then does not require any special protective treatments. Moreover, for the casement frames, wood materials such as glued wood constructions or strips of wood fibres, thus materials which up to now had proven to be insufficiently resistant to weathering, can be used. Through the concept of covering the casement frames by means of the blind frame, higher thermal insulation values of the frame part of the window are achieved. In view of the low k-values of about $k=1.2$ W/m$^2$ K, the increase in the thermal insulation values of the window framing is of particular importance.

The concept of covering the casement frame by means of the blind frame proves to be especially advantageous in the case of cladding wooden windows with metal or plastic profiled strips. In a way that saves material, one then requires the cladding only for the blind frame while in the case of a casement frame, protruding partially beyond the blind frame, its sides would have to be provided with a cladding on both sides. Moreover, with this construction, a double stop of the casement frame against the blind frame can be achieved in a simple way resulting in a higher rigidity and mechanical strength against lateral thrusts due to wind. Due to this higher rigidity and mechanical strength, both the casement frame as well as the insulating glass pane frame can be made of narrow profiles. By rounding the outsides of the insulating glass pane frame, parallel to the axis of rotation, and the corresponding insides of the casement frame, a longer slot is obtained thereby improving the sealing effect. In addition, the insulating glass pane frame in the casement frame is furthermore protected against lateral thrusts due to wind acting on the total surface of the insulating glass pane, whereby only one locking mechanism, to be fastened on one side, is needed. For the casement frame and the blind frame, unchanged conventional window modules and their forms of attachment, such as rotating/tilting window mountings or vertical casement fittings and the corresponding gaskets, can be used.

The cladding, arranged on the outside of the blind frame, can advantageously have bent sides, lying with a gasket directly against the insulating glass pane. In this case, the casement frame does not have to be covered by a trim against the blind frame since this function is completely assumed by the cladding. Of course, the cladding then has to be of sufficiently rigid construction. In the embodiment in which there is in fact no actual casement frame but where the insulating glass pane with the frame is hinged via guides to the structurally fixed blind frame, the parallel guides can be designed in such a way that, to open the frame in the axis of a swivel hinge is located on the frame in the axis of a conventional window fitting. The insulating glass pane with frame can then be opened and closed just like a normal casement. In this case the guides are fixed to the insulating glass pane frame by means of a locking mechanism.

In order to rotate the insulating glass pane 180°, this locking mechanism is released and locked again after the 180° rotation.

In another embodiment of an insulating glass pane frame, guided on parallel guides, the former can have on two opposed sides, parallel to the axis of rotation, half-round exterior surfaces of which one forms together with corresponding surfaces of the blind frame the swivel hinge to open the casement, in which case the guides can be hinged to the blind frame in the center of the half-round surfaces of the insulating glass pane frame. Preferably, the structurally fixed blind frame can have on at least one side a round corner, congruent with the half-round outer surfaces of the insulating glass pane frame.

In both embodiments of the guide-controlled insulating glass pane frame, it can be advantageous to facilitate the 180° rotation by arranging the reversing hinge for the 180° rotation of the insulating glass pane in a movable way on the guides and allowing it to move after the release of the locking mechanism.

At least in the area of the lower rail of the casement frame, a pressure plate can be arranged which carries the weight of the insulating glass pane and, if necessary, of the insulating glass pane frame and which preferably consists of a hard-surface elastic plastic of high sliding ability such as, for example, a polyamide. The pressure plate can extend over the total length of the lower rail and in this way assume in this area a supplementary sealing function. The pressure plate is advantageous in the case of vertical as well as horizontal axes of rotation of the insulating glass pane. In the case of a vertical axis of rotation, pivot pins can penetrate the pressure plate and can be supported by end support plates arranged in the upper and lower rails.

BRIEF DESCRIPTION OF THE DRAWINGS

Having thus generally described the nature of the invention, reference will now be made to the accompanying drawings, showing by way of illustration several preferred embodiments thereof, and in which:

FIG. 5 is a longitudinal cross-sectional view through the window of FIG. 9 along the line 5—5;

FIG. 6 is a cross-sectional view through the window of FIG. 9 along the line 6—6;

FIG. 7 is a longitudinal cross-sectional view through the window of FIG. 9 along the line 8—8; with detailed representation of a metal or plastic cladding;

FIG. 8 is a perspective inside view of the window according to the present invention in an opened position thereof.

DETAILED DESCRIPTION OF EMBODIMENTS OF THE INVENTION

Figure 1:
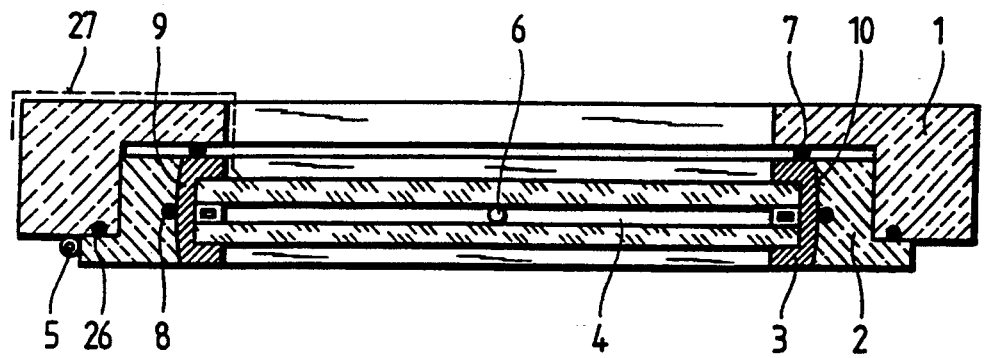
FIG. 1 is a cross-sectional view through a window in accordance with a first embodiment of the present invention.

The window according to the present invention is in each case only schematically represented in cross-sectional views and, in the embodiment illustrated in FIG. 1, the window has a structurally fixed blind frame 1 of conventional type. In an appropriate opening of the blind frame 1, a casement frame 2 is fitted and is hinged to the blind frame 1 by means of a swivel hinge 5 having the form of a conventional hinge. This casement frame 2 fits against the blind frame 1 with a double rabbet.

An insulating glass pane 4, which in a known way can consist of a colorless glass pane and a selective absorption pane arranged at a distance to the former, is enclosed in an insulating glass pane frame 3. By means of a reversing hinge 6, which is arranged in the vertical, central axis of the insulating glass pane 4 and which is not shown in detail, the insulating glass pane 4 together with the insulating glass pane frame 3 can be turned, after releasing a locking mechanism (not shown), 180° in the casement frame 2 and can again be locked.

On a circumferential protrusion of the blind frame 1, in the range of one side face of the insulating glass pane frame 3, an encircling gasket 7 is arranged against which the glass pane frame 3 fits when the window is closed thereby ensuring the sealing. It is obvious that due to this one gasket 7, a complete sealing of the casement is ensured without an additional gasket being required between the insulating glass pane frame 3 and the casement frame 2. Nevertheless, in certain applications, it can be useful to arrange further gaskets 8 and 26 between the insulating glass pane frame 3 and the casement frame 2 and/or between the window frame 1 and the casement frame 2 without, however, this being necessary in most applications.

The outside surfaces 9 of the insulating glass pane frame 3, which are parallel to the axis of rotation through the reversing hinge 6, are rounded with a radius which corresponds to the distance to the axis of rotation. The corresponding inside surfaces 10 of the casement frame 2 are also rounded so that the insulating glass pane frame 3 can be fitted into the casement frame 2 with little clearance. The insulating glass pane frame 3 is on the inside flush with the blind frame 1 so that with a single cladding 27 of metal or plastic profiles, the blind frame 1 as well as the casement frame 2 can be covered. In this way it is possible to save on repeated coverings. With a conventional vertically rotating casement, one would for this purpose have to cover the blind frame separately and in addition the vertically opening casement, the latter on both sides thereof.

Figure 2:
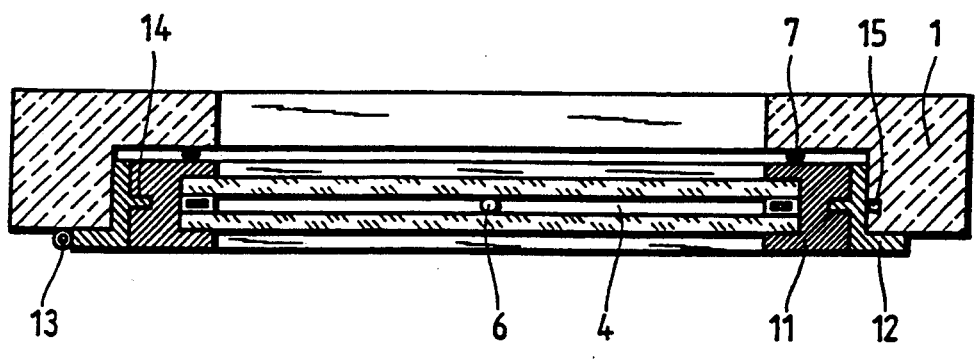
FIG. 2 is a cross-sectional view through a window according to the present invention in accordance with a second embodiment thereof.

In the case of the embodiment illustrated in FIG. 2, a method of representation is selected from which it follows that the structurally fixed blind frame 1 can be made of wood or plastic and the casement frame 12 of an aluminium, plastic or wood profile which is resistant to warping i.e., has torsional rigidity so that the casement frame 12 will not twist when subjected to force. The insulating glass pane frame 11, which encloses the insulating glass pane 4, can be made of wood or plastic. The casement frame 12 is hinged in the usual way by means of hinges 13 to the structurally fixed blind frame 1. In the casement frame 12, there are on opposite sides locking mechanisms 14 and 15, of which the locking mechanism 14 interacts with the insulating glass pane frame 11 whereas the locking mechanism 15 interacts with the blind frame 1.

If the insulating glass pane frame 11 and the casement frame 12, as shown, have straight-line contacts, a somewhat greater clearance is needed between the insulating glass pane frame 11 and the casement frame 12 for the 180° rotation of the insulating glass pane 4 than in the case of the embodiment of FIG. 1 so that in this case, an additional gasket between the insulating glass pane frame 11 and the casement frame 12 can be advantageous.

Figure 3:
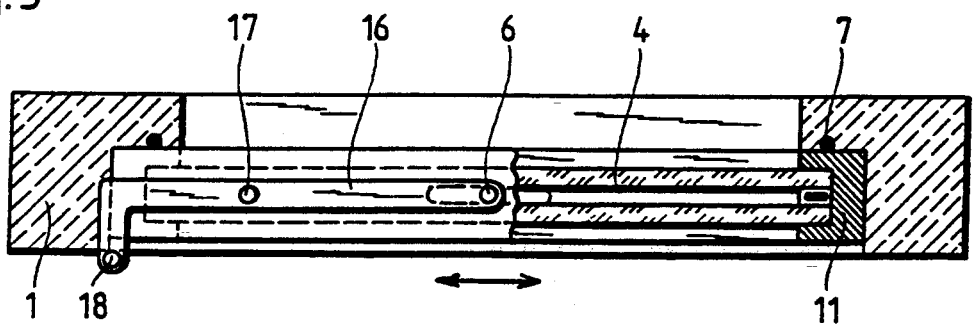
FIG. 3 is a cross-sectional view through a window according to the present invention, in which, according to a first embodiment, the insulating glass pane frame is hinged to the structurally fixed blind frame via guides.

In the exemplified embodiment illustrated in FIG. 3, the insulating glass pane 4 together with the insulating glass pane frame 11 form the casement, without the use of an additional frame. In order to open this casement in the usual manner and to be able to carry out the 180° rotation, parallel guides 16 are arranged above and below the insulating glass frame 11 and are hinged, on one hand, to the insulating glass pane frame 11 by means of the reversing hinge 6 and, on the other hand, via hinges 18 to the window blind frame 1. In addition, a locking mechanism 17, which is not shown in detail, is provided between the guides 16 and the insulating glass pane frame 11. As long as this locking mechanism 17 is locked, the insulating glass pane 4 together with the insulating glass pane frame 11 can be opened as a normal window in which case, being held by the guides and directed by the hinges 18, it swings out. On closing, the insulating glass pane frame 11, as already described, rests against a protrusion of the blind frame 1 and at the same time seals off the encircling gasket 7.

If the insulating glass pane 4 with the insulating glass pane frame 11 has to be rotated 180° around the reversing hinge 6, the locking mechanism 17 is released with the window opened and locked again after the 180° rotation.

Figure 4:
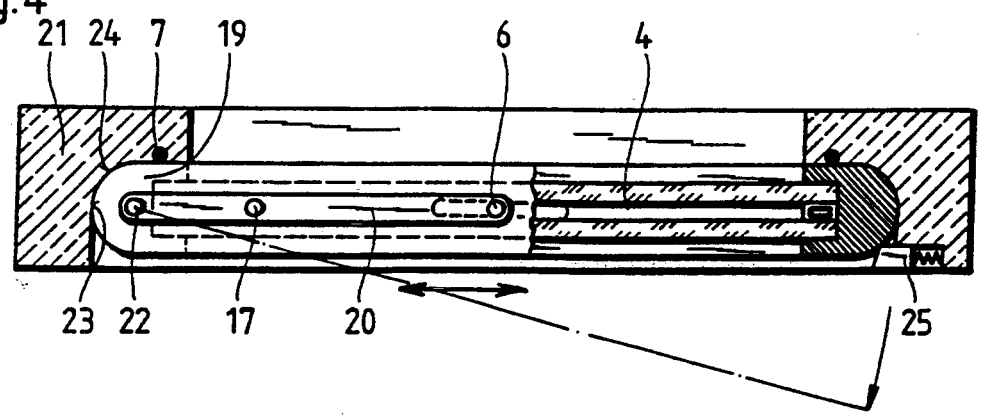
FIG. 4 is a cross-sectional view through a window according to the present invention, in which, according to a second embodiment, the insulating glass pane frame is hinged to the structurally fixed blind frame via guides.
Figure 9:
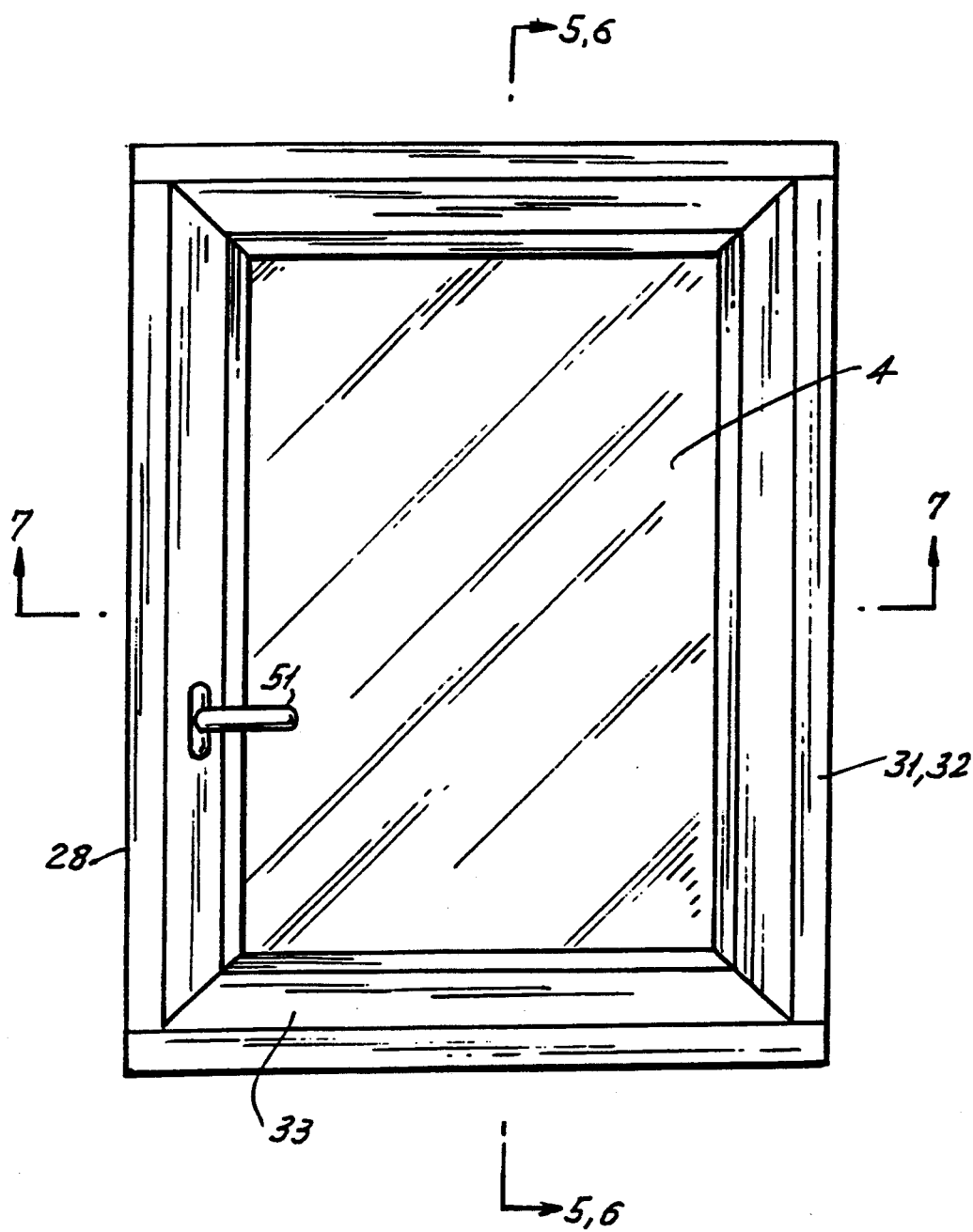
FIG. 9 is a plan view of the window according to the present invention in a closed position thereof.

In the exemplified embodiment shown in FIG. 4, guides 20 are hinged to the blind frame 21 in the plane of the insulating glass pane 4. The insulating glass pane frame 19 has a half-round cross-section on its outside surfaces 23 which are parallel to the axis of rotation running through the reversing hinge 6, and which act together with corresponding congruent round corners 24 of the blind frame 21 in the way of hinges. To make it possible to open without forcing the casement designed in this fashion, the guides 20 are hinged to the blind frame 21 in the center of the semi-circle of the outside surfaces 23. The locking mechanism 17 between the guides 20 and the insulating glass plane frame 19 is also herein provided. The round corner 24 in the blind frame 21 can, as illustrated, form a quart-circle and then change into straight lines perpendicular to each other. However, it is also possible to lead the round corner 24 by more than 90° around the half-round outside surface 23 in order to control the swivel hinge in this area free from play and to relieve the swivel hinge 22 of the guides 20 from too great of a load. In this case, the 180° rotation of the insulating glass pane 4 with the insulating glass pane frame 19 can be made easier if the reversing hinge 6 is arranged in the guides 20 so that it can be moved, whereby after releasing the locking mechanism 17, the insulating glass pane 4 with the insulating glass pane frame 19 can be pulled out of the hinges formed by the half-round surfaces 23 and the round corner 24.

On the side of the blind frame 21 opposite to the round corner 24, a round corner can likewise be designed in which the locking of the casement in its closed position can take place by means of a spring-loaded strip 25.

Also in the embodiment shown in FIG. 4, only one encircling gasket 7 is present between the blind frame 21 and the insulating glass pane frame 19. Furthermore, it is observed that a swivel hinge is also then provided with the half-round external surfaces 23 even if the blind frame 21 does not have a round corner 24 but the pertinent surfaces on the blind frame 21 are standing perpendicular to each other. In this case there is, however, no surface contact but only a linear contact between the half-round surfaces 23 and the blind frame 21.

In all embodiments, it is possible to do completely without an insulating glass pane frame, if the insulating glass pane 4 is hinged and locked in a suitable way directly to the casement frame 2 or 12 or to the guides 16 or 20. In all cases, the sealing and encircling gasket 7 on the blind frame 1 or 21 are important.

The embodiments illustrated in FIGS. 5 to 8 show respectively a detailed cross-section and a perspective, in which the window according to the invention has a blind frame 28 with an attached wooden trim 29. The blind frame 28 is provided with a stepped notch 30 which cooperates with a corresponding stepped notch 34 on the casement frame 33 through the intermediary of an encircling gasket 42. The insulating glass pane 4 is held in an insulating glass pane frame 31 by means of a cover strip 32.

The vertical axis of rotation 6 is obtained by means of a couple of pivot pins 35 connected to the insulating glass pane frame 31 by means of a fastening plate 36. The illustrated lower pivot pin 35 can be adjustable in height and is supported in an end support plate 37 embedded in the casement frame 33. This end support plate 37 assumes control of the rotation of the insulating glass pane 4 while the weight of the insulating glass pane 4 and of the insulating glass pane frame 31, 32 is carried by a pressure plate 38. This pressure plate 38 is embedded, while slightly protruding, in the lower rail of the casement frame 33 and extends almost across the width of the casement frame 33. Preferably, the pressure plate 38 extends across the entire length of the lower rail of the casement frame 33 and forms thus a seat of large surface for the insulating glass pane frame 31, 32 or directly for the insulating glass pane 4 in case it is attached without a frame, in a 180° rotatable way, to the casement frame 33.

The pressure plate 38 consists preferably of a hard-surface elastic plastic with high slidability, e.g. a polyamide, and provides in this area an additional reliable gasket.

The insulating glass pane 4 with its frame 31, 32 can, as shown, be arranged with a vertical axis of rotation in the casement frame 33. In this case, the rounded outsides 9, shown in FIG. 6, of the insulating glass pane frame 31, 32 and the rounded insides 10 of the casement frame 33 are vertical and parallel to the axis of rotation 6. The pressure plate 38 is in the area of the lower pivot pin 35 which penetrates the pressure plate 38 down to the end support plate 37.

If the window according to the invention has an insulating glass pane 4 with a horizontal axis of rotation, the rounded outsides and insides 9 and 10 respectively are in the area of the upper and lower rail of the insulating glass pane frame 31, 32 and the casement frame 33, and the pressure plate 38 is arranged in the area of the lower rail. In this case, the pressure plate 38 serves to relieve the pivot pin 35 and the end support plate 37 when the window is closed.

The window shown in FIGS. 5 and 6 can be covered, as illustrated in FIG. 7, with a cladding 43 arranged on the outside of the blind frame 28, 29. This cladding 43 has slots 45 into which attachment elements 44 fit and are screwed to the blind frame 28, 29. A bent side 46 on the cladding 43 reaches up to the area of the edge of the insulating glass pane 4 and lies against the insulating glass pane 4 by means of a gasket 47.

Consequently, in the exemplified embodiment shown in FIGS. 5 to 7, the gasket 47 is between the side 46 and the insulating glass pane 4, two gaskets 39, 40 are between the trim 29 and the insulating glass pane frame 31, a gasket 41 is between the trim 29 and the casement frame 33 as well as the gasket 42 between the blind frame 28 and the casement frame 33 in the area of the stepped notches 30, 34. The cladding 43 can consist of metal or plastic and, if necessary, it can be designed in such a way that one can get by without the trim 29. In this case, the cladding and its attachment have to be made sufficiently rigid to achieve an effective sealing either by means of the gasket 47 by itself or by one or several additional gaskets disposed between the cladding and the insulating glass pane frame 31, 32 and/or the casement frame 33.

Water, in particular condensation water, entering the gap between the cladding 43, 46 and the blind frame 28, 29, the insulating glass pane frame 31, 32 and the casement frame 33 is drained off to the outside via a corner fillet 48.

In FIG. 8, the window according to the present invention is shown in perspective in accordance with FIGS. 5 and 6. The casement is opened so that one can recognize the casement frame 33 with a three-sided locking band 50 and a locking handle 51. The insulating glass pane frame 31, 32 is released and opened out so that it can be seen how the changeover from the summer to the winter position takes place. The casement frame 33 is hinged by means of a conventional hinge type joint 49 to the blind frame 28 so that the window according to the present invention can be manipulated just as a completely conventional window.

It is obvious that with regard to the opening method, the casement in all embodiments can be designed as a rotating casement as well as a tilting and top-hung sash.

What is claimed is:

1. A window for being attached to a structure having an inside and an outside, the window comprising:
   a blind frame,
   a glass pane frame in the blind frame, and a glass pane disposed within the glass pane frame, the glass pane having a first side and a second side,
   pivot means pivotably connecting the glass pane frame and the blind frame, and aligned with a central axis of the glass pane frame for pivoting the glass pane frame, in the blind frame, 180° around the central axis such that the glass pane is moved between a first position, in which the first side faces toward the inside of the structure and the second side faces toward the outside of the structure, and a second position, in which the first side faces toward the outside of the structure and the second side faces toward the inside of the structure,
   hinge means hingedly connecting the glass pane frame and the blind frame for pivoting the glass pane frame in the blind frame between an open and a closed position with respect to the blind frame, and
   at least one first sealing strip attached to the blind frame for producing a seal between the glass pane frame and the blind frame in both the first position and the second position of the glass pane when the glass pane frame is in the closed position.

2. The window as in claim 1, wherein the glass pane includes a pane of insulating glass.

3. The window as in claim 2, wherein the insulating glass includes a colorless glass pane and a selective-absorption pane.

4. The window as in claim 1, wherein the hinge means includes a pair of substantially parallel guides, one end of each guide being attached to the pivot means and the other end of the guide being attached to the blind frame at the hinge means, the guides being structured and arranged to fold in with the glass pane frame into the blind frame, and to lock into position with the glass pane frame.

5. The window as in claim 4, wherein the pivot means is structured and arranged to move in the guides.

6. The window as in claim 1, wherein the glass pane frame includes opposite side surfaces that are outwardly rounded and the blind frame includes correspondingly shaped inner side surfaces, the outwardly rounded side surfaces cooperate with the correspondingly shaped surfaces on the blind frame to form the hinge, and
   the window further comprising a pair of substantially parallel guides, one end of each guide being attached to the pivot means, the guides being structured and arranged to articulate to the blind frame in the same plane as the glass pane frame, fold in with the glass pane frame into the blind frame, and to lock into position with the glass pane frame.

7. The window as in claim 6, wherein the pivot means is structured and arranged to move in the guides.

8. The window as in claim 6, wherein the outwardly rounded side surfaces are generally parallel to the central axis, and the guides articulate to the blind frame at the center of curvature of one of the outwardly rounded side surfaces.

9. The window as in claim 6, wherein the correspondingly shaped surfaces on the blind frame are concave surfaces that are congruent with the outwardly rounded side surfaces.

10. The window as in claim 1, wherein at least the blind frame is clad on the outside with metal or plastic section.

11. A window for being attached to a structure having an inside and an outside, the window comprising:
   a blind frame,
   a casement frame in the blind frame,
   hinge means hingedly connecting the casement frame and the blind frame for pivoting the casement frame in the blind frame between an open and a closed position with respect to the blind frame,
   a glass pane frame in the casement frame, and a glass pane disposed within the glass pane frame, the glass pane having a first side and a second side,
   pivot means pivotably connecting the glass pane frame and the casement frame, and aligned with a central axis of the glass pane frame for pivoting the glass pane frame, in the casement frame, 180° around the central axis such that the glass pane is moved between a first position, in which the first side faces toward the inside of the structure and the second side faces toward the outside of the structure and a second position, in which the first side faces toward the outside of the structure and the second side faces toward the inside of the structure, and
   at least one first sealing strip attached to the blind frame for producing a seal between the glass pane frame and the blind frame in both the first position and the second position of the glass pane when the casement frame is in the closed position.

12. The window as in claim 11, wherein means are provided for locking at least one of the pane of glass and the glass pane frame with the casement frame.

13. The window as in claim 11, wherein a second sealing strip is provided between the glass pane frame and the casement frame.

14. The window as in claim 11, wherein the glass pane frame has opposite side surfaces that are generally parallel to the central axis;
   the opposite side surfaces being outwardly rounded, and the casement frame around the glass pane frame having inner side surfaces that are correspondingly shaped;
   the outwardly rounded side surfaces of the glass pane frame and the inner side surfaces of the casement frame having respective radii, the length of the respective radii being substantially equal to the distance between the corresponding side surfaces and the central axis.

15. The window as in claim 11, wherein the blind frame is made of a material selected from the group consisting of wood, aluminum and plastic; the casement frame is made of a material selected from the group consisting of torsion-resistant structural aluminum, plastic and wood; and the glass pane frame is made of a material selected from the group consisting of wood and plastic.

16. The window as in claim 11, wherein a second sealing strip is provided between the casement frame and the blind frame.

17. The window as in claim 11, wherein an outer edge of the casement frame is covered by the blind frame where the outer edge rests against the blind frame.

18. The window as in claim 11, wherein the casement frame rests against the blind frame at two points, a second sealing strip being provided at least at one of the two points.

* * * * *